United States Patent [19]

Botes

[11] Patent Number: 4,615,055
[45] Date of Patent: Oct. 7, 1986

[54] ACCESSORY FOR A TOILET RECEPTACLE

[76] Inventor: Hendrik P. Botes, P.O. Box 9330, Brentwood Park, 1505, South Africa

[21] Appl. No.: 745,328

[22] Filed: Jun. 14, 1985

[30] Foreign Application Priority Data

Jun. 19, 1984 [ZA] South Africa .............. 84/4637

[51] Int. Cl.⁴ ............................................. A47K 13/00
[52] U.S. Cl. ............................................ 4/235; 4/237; 4/254
[58] Field of Search ............................. 4/254, 237, 235

[56] References Cited

U.S. PATENT DOCUMENTS

| | | | |
|---|---|---|---|
| 1,297,177 | 3/1919 | Johnson | 4/254 |
| 1,752,499 | 4/1930 | Meath | 4/235 |
| 3,383,714 | 5/1968 | Minasian et al. | 4/254 |
| 4,205,404 | 6/1980 | Levins | 4/254 |
| 4,516,279 | 5/1985 | Block | 4/235 |
| 4,534,072 | 8/1985 | Lipski | 4/237 |

Primary Examiner—Henry K. Artis
Attorney, Agent, or Firm—Ladas & Parry

[57] ABSTRACT

The invention relates to an accessory for a toilet receptacle which includes an auxiliary seat adapted to be positioned on the existing ring seat of a toilet receptacle and act as a toilet seat for small children. The auxiliary seat is mechanically connected to a platform which can serve as a step for small children to enable them to seat themselves on the auxiliary seat, the seat including the platform being displaceable between inoperative and operative positions, so that use of the toilet receptacle by adults is not unduly inhibited.

9 Claims, 6 Drawing Figures

ACCESSORY FOR A TOILET RECEPTACLE

BACKGROUND OF THE INVENTION

1. Field of the Invention

This invention relates to an accessory for a toilet receptacle. The accessory is particularly adapted for use on toilet receptacles as are conventionally installed in toilets of domestic homes and which have a ring seat provided to cover the rim of the receptacle.

2. Description of the Prior Art

It is well known in the prior art to provide auxiliary seats that are adapted to be positioned on the existing ring seats of toilet receptacles and which facilitate the use of such toilet receptacles by small children. U.S. Pat. No. 426,287, 522,163, 1,189,767, 2,517,755, 2,494,813 and 4,461,046 amongst others illustrate typical examples of such auxiliary seats.

Although effective as seats, use of toilet receptacles by small children remained difficult because of the height of most receptacles. The use of suitable platforms positionable in front of toilet receptacles resulted and typical examples of such arrangements are illustrated in U.S. Pat. Nos. 1,752,499 and 2,834,028 as well as British Pat. Nos. 1299355 and 756,852 and German Pat. Nos. DE 595534, DE 8333496 and DE-GM 7000037.

The main problem with the use of all the above arrangements is that, when in position, use of the toilet receptacle by adults is effectively rendered impossible or very difficult, since the platform and/or auxiliary seat is in the way. This means that the platform must be shifted out of the way, if it is an independant unit, or the complete accessory including a seat and a platform must be moved away to provide access. As soon as it becomes necessary to displace the platform and/or seat of an accessory of the above kind, its effectiveness reduces as small children in particular are not usually able to position them properly or promptly and a tendency results not to use the accessory, thus rendering it obsolete. This clearly also inhibits the effective use of an accessory of the above type as a toilet trainer.

Typically, U.S. Pat. No. 1,752,499 (Meath) shows a toilet accessory including an auxiliary seat and a platform, in which the platform will clearly inhibit use of the toilet receptacle by adults. Once removed, its replacement is fairly difficult and it is unlikely that small children will be able to attend thereto. U.S. Pat. No: 2,834,028 (Stanley) shows an independant platform that is adapted to shift out of the way when required, but it involves a complete set of platform sections which must be pivotally displaced and by the time a small child has displaced the platform into a required position and rendered it operative it may often be too late. However, it will be appreciated that Stanley did in fact envisage the abovementioned problem, but the applicant believes that his suggested way of overcoming the problem will prove not very effective. Stanley does also not make provision for a toilet seat as such. British Pat. Nos. 1 299 355 and 756,852 as well as German Pat. Nos. DE 595534 and DE 8333496 illustrate accessories including a seat and a platform but the above problem of use by adults can only be overcome by complete removal of the accessory. Subsequent use by children will thus require replacement and as this will clearly be problematical, the effectiveness of these accessories are doubtful. These particular accessories can only be used effectively where children have their own toilet for their exclusive use, which is not usually the case.

OBJECTS OF THE PRESENT INVENTION

It is an object of the present invention to provide an accessory for a conventional toilet receptacle which can be effectively used by small children as a toilet seat when positioned on top of the toilet receptacle.

It is a further object of the present invention to provide such an accessory which does not unduly inhibit use of the toilet receptacle by adults but which, at the same time, does not require complete removal which will render it difficult to be replaced into its operative configuration by small children.

SUMMARY OF THE INVENTION

According to the invention there is provided an accessory for a toilet receptacle, which includes an auxiliary seat, adapted to be positionable on the existing ring seat of a toilet receptacle and having an aperture therein which is smaller than the aperture through the ring seat;

a platform for standing on operatively positionable in front of the toilet receptacle spaced above the floor on which the receptacle is located; and a platform support means to which the platform is fixedly secured and which is pivotally secured to the auxiliary seat so that, when positioned on the ring seat of a toilet accessory, the auxiliary seat is pivotally displaceable between its operative position on the ring seat of the toilet receptacle and an inoperative position in which it is angularly displaced from the ring seat rendering the ring seat accessible for normal use.

The location of the pivots, whereby the platform support means is pivotally secured to the auxiliary seat, may be such that the platform is displaced between its operative configuration and a retracted configuration beneath the bowl formation of a toilet receptacle, as the auxiliary seat is pivotally displaced between its operative and inoperative positions.

The disposition of the auxiliary seat and platform, in their operative configurations, may be such that use of the toilet by small children is facilitated, the platform acting as a step between the floor and the auxiliary seat and the aperture in the auxiliary seat being of a size to act as an effective ring seat for small children.

The support means may comprise two support legs secured to the auxiliary seat and platform on opposite sides thereof. The support legs may extend beyond the platform to abut the floor in front of a toilet receptacle, in the operative configuration of the accessory, thereby enhancing the stability of the platform.

Furthermore, the auxiliary seat of the accessory of the invention may define handle formations to permit the manipulation thereof. Also, the auxiliary seat may be suitably profiled to ensure proper seating thereon by small children.

The auxiliary seat, the platform and the support means of the accessory of the invention may be of a synthetic plastics material being separately moulded and defining suitable formations for their assembly by clipping them together. Preferably, the auxiliary seat, platform and support means can releasably clip together to permit easy disassembly and assembly of the accessory.

As such, the invention extends to a kit including an auxiliary seat, a platform and platform support means which can be assembled together to form an accessory in accordance with the present invention.

BRIEF DESCRIPTION OF THE DRAWINGS

The invention is now described, by way of an example, with reference to the accompanying diagrammatic drawings, in which.

DESCRIPTION OF THE PREFERRED EMBODIMENTS

Figure 1:
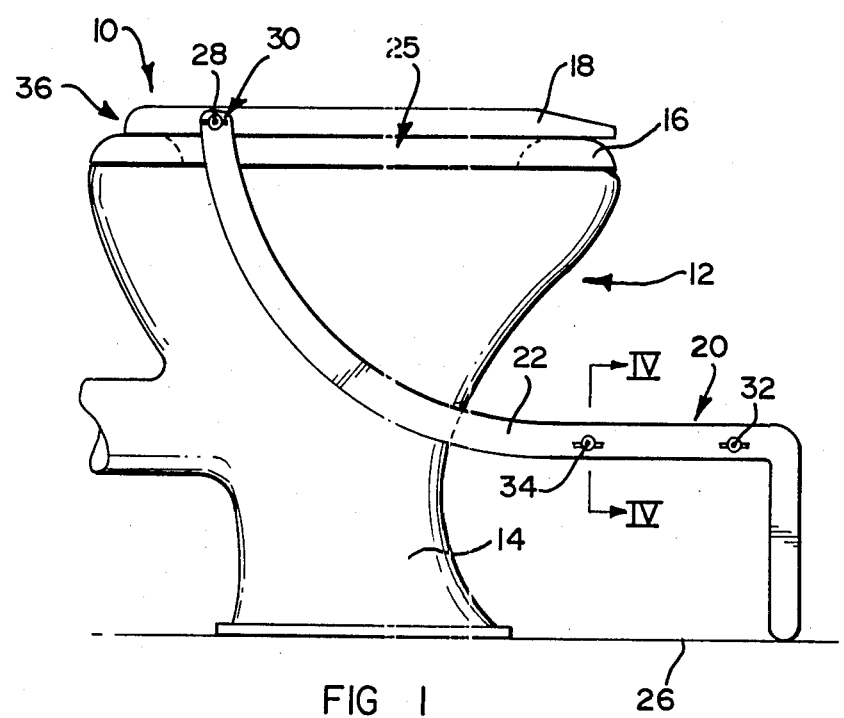
FIG. 1 shows a side view of an accessory for a toilet receptacle, in accordance with the invention, in its operative configuration.

Referring to the drawings, an accessory for a toilet receptacle, in accordance with the invention, is generally indicated by the reference numeral 10.

A typical toilet receptacle is generally indicated by the reference numeral 12 and includes a receptacle 14 as such onto which a ring seat 16 is mounted in a configuration in which it can cover the rim of the receptacle 14.

The accessory 10 includes an auxiliary seat 18 and a platform 20, the seat 18 and platform 20 being secured to one another by means of two elongate support legs 22, in the manner hereinafter described.

The auxiliary seat 18 is adapted to effectively fit onto the ring seat 16 of the toilet receptacle 12 (as shown in FIG. 1), the seat 18 having an aperture 24 therein which is smaller than and in register with the aperture 25 defined by the ring seat 16 so that communication with the interior of the receptacle 14 is provided for. With the auxiliary seat 18 in this position, the platform 20 is disposed in front of the receptacle 14 at a spaced location above the floor 26 onto which the toilet receptacle 12 is installed. The disposition of the platform 20 and the auxiliary seat 18 is particularly such that use of the toilet receptacle by small children is greatly facilitated insofar as the platform acts as a step enabling such children to seat themselves onto the auxiliary seat 18, which in itself is specifically designed for this purpose.

As is clearly shown in FIG. 1, the support legs 22 extend beyond the platform 20 and abut the floor 26 to thereby determine the exact position of the plafrom 20 and also render it suitably stable for use.

In the particular configuration shown, the auxiliary seat 18, the platform 20 and the support legs 22 are all separately moulded synthetic plastics components which can effectively clip together to form the complete accessory 10. In order to facilitate this, the auxiliary seat 18 has a pair of longitudinally split, pivot pins 28 defining conicle heads projecting therefrom on opposite sides thereof. The pins 28 are adapted to engage suitable apertures 30, defined at one end of the support legs 22, by forcing the heads of the pins 28 through the apertures 30 and thereby providing for the seat 18 and legs 22 to be pivotally secured to one another. Similarly, the platform 20 has two pairs of similar projecting pins, 32 and 34 respectively, projecting therefrom, the pins 32 and 34 again defining conicle heads to permit engagement with suitable apertures defined therefor within the opposing support legs 22. In this way, the platform 20 is thus fixedly secured to the support legs 22 when all the abovementioned components are assembled.

Figure 2:
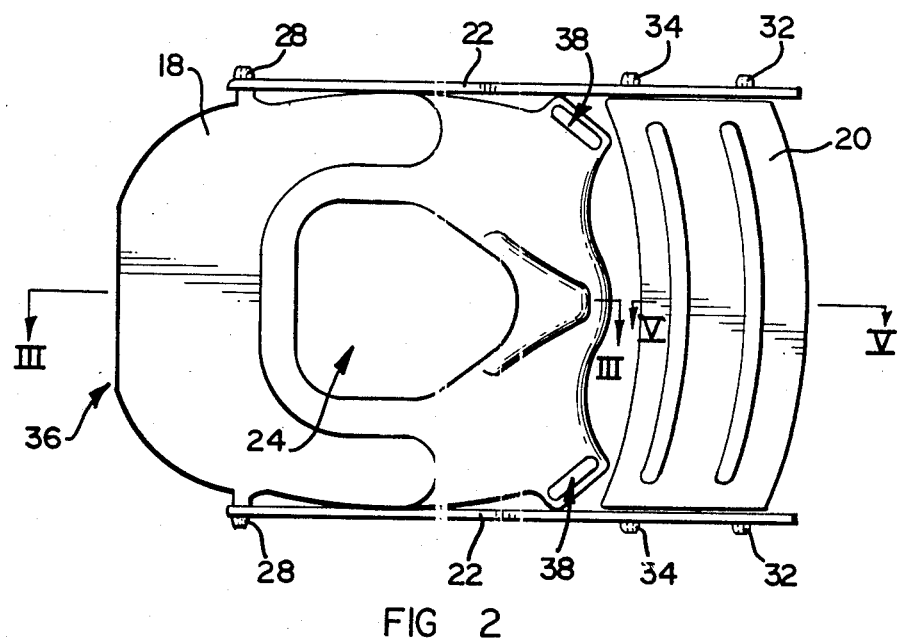
FIG. 2 shows a top plan view of the accessory of FIG. 1.
Figure 3:
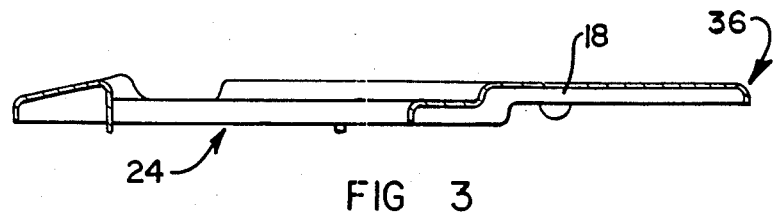
FIG. 3 shows a cross-sectional side view of the auxiliary seat of the accessory of FIG. 1 along line III—III of FIG. 2.
Figure 4:
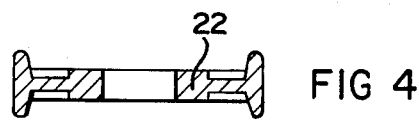
FIG. 4 shows a cross-sectional end view of one of the support legs of the accessory of FIG. 1, along line IV—IV of FIG. 1.
Figure 5:
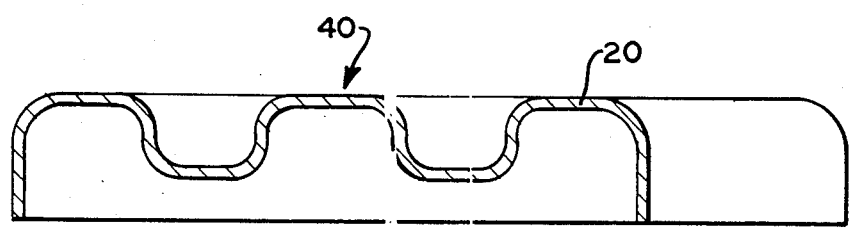
FIG. 5 shows a cross-sectional side view of the platform of the accessory of FIG. 1 along line V—V of FIG. 2.
Figure 6:
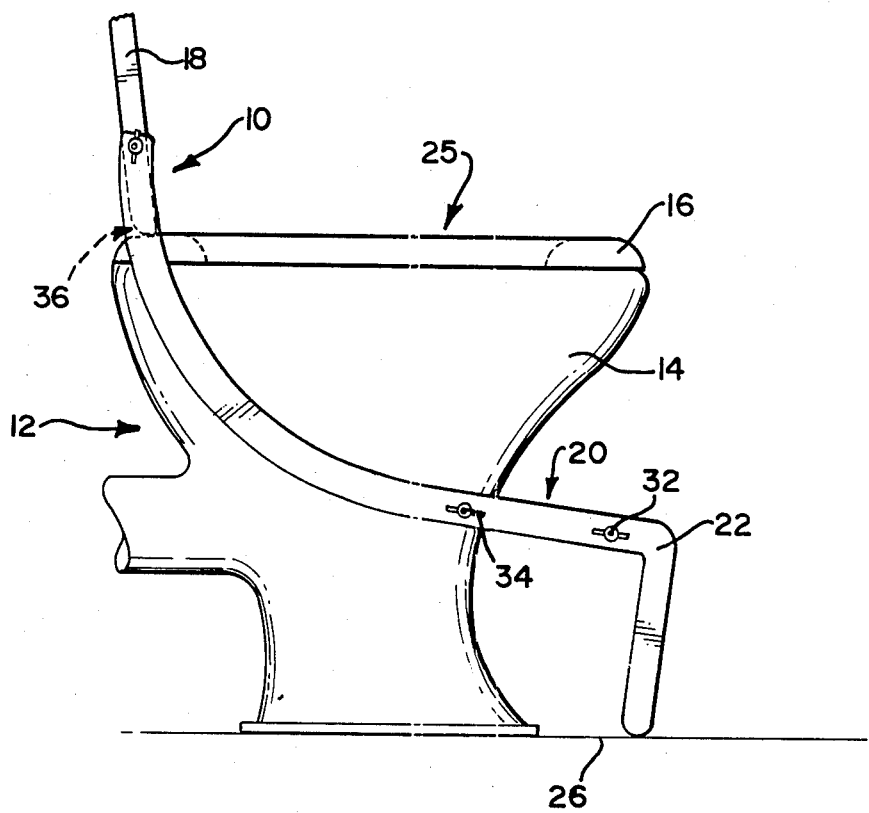
FIG. 6 shows a side view of the accessory of FIG. 1 in its inoperative configuration with respect to a toilet receptacle.

The configuration of the seat 18, platform 20 and support legs 22 permit the auxiliary seat 18 to be pivotally displaced into an inoperative substantially vertical configuration about its rear end 36 (as shown in FIG. 6), the end 36 of the auxiliary seat 18 thus remaining in abutment with the ring seat 16 of the toilet receptacle 12. During such displacement, and as is also clear from FIG. 6, the platform 20 is retracted into an inoperative position effectively beneath the receptacle 14, thereby permitting the uninhibited use of the toilet receptacle in a conventional manner. As such, the toilet receptacle 12 can be used by adults in the normal way, with the auxiliary seat 18 pivoted into an inoperative configuration and the platform 12 displaced into its retracted position, and also by smaller children when the auxiliary seat 18 is in its operative configuration and the platform 20 is in a suitable position to serve as a step for such children to position themselves onto the seat 18. Two handle formations 38 are defined by the auxiliary seat 18 which will facilitate the displacement thereof between its operative and inoperative positions. Furthermore, the auxiliary seat 18 is specifically adapted and profiled (as can be seen clearly in FIGS. 2 and 3) to ensure proper seating by a child himself on the seat 18 during use thereof. The disposition of the legs 22 ensure proper location of the accessory 10 during the displacement thereof between its operative and inoperative positions.

The platform 20 is also profiled, as shown, the exposed top surface 40 thereof being provided with non-slip qualities which will ensure the safe use of the accessory 10 by smaller children. The curvature of the platform 20, as is clearly illustrated in FIG. 2, permits the platform 20 to be retracted completely when the seat 18 is displaced into its inoperative configuration, thus ensuring that use of the toilet by adults is not unduly inhibited.

It is a usual problem with accessories of the above type, particularly when they include a platform, that the seat and/or the platform must be completely removed to permit use of the toilet receptacle by an adult. Replacement is always inconvenient and sometimes difficult, resulting in such accessories not being used or being improperly used. By the use of the accessory 10, in accordance with the invention, the above problems are effectively overcome and as the accessory 10 can be rendered operative and inoperative by the simple pivotal displacement thereof, it can easily be used by both adults and small children. Toilet training for small children will be greatly enhanced, by the use of the accessory 10, small children at the same time being encouraged to use toilets independantly.

All the components of the accessory 10 are integrally moulded components and being of relatively simple construction an economically viable unit is provided. It will, however, be appreciated that alternative materials can also be utilised for the different components of the accessory 10 and the specific configuration thereof may also be significantly altered while still incorporating the main principles as described and defined above.

The specific design of the accessory 10 is clearly determined by the design of the toilet receptacle including its seat and two or more differently designed accessories 10 may be provided for use on specific ranges of toilet receptacles.

Being of the specific construction as described above, it will be appreciated that the accessory 10 can be easily assembled and disassembled and can therefore be provided in a kit form which will facilitate its packaging and transport before sale to the final consumer. Also, once the use of the accessory 10 by a particular child has become unnecessary, the accessory 10 can be easily disassembled and stored away for use by subsequently born children.

What is claimed is:

1. An accessory for a toilet receptacle, which includes
   an auxiliary seat, adapted to be positionable on the existing ring seat of a toilet receptacle and having an aperture therein which is smaller than the aperture through the ring seat;
   a platform for standing on, operatively positionable in front of the toilet receptacle spaced above the floor on which the receptacle is located; and
   a platform support means to which the platform is fixedly secured and which is pivotally secured to the auxiliary seat so that, when positioned on a ring seat of a toilet accessory, the auxiliary seat is pivotally displaceable between its operative position on the ring seat of the toilet receptacle and an inoperative position in which it is angularly displaced from the ring seat rendering the ring seat accessible for normal use.

2. An accessory as claimed in claim 1, in which the location of the pivots, whereby the platform support means is pivotally secured to the auxiliary seat, are such that the platform is displaced between its operative configuration and a retracted configuration beneath the bowl formation of a toilet receptacle as the auxiliary seat is pivotally displaced between its operative and inoperative positions.

3. An accessory as claimed in claim 1 in which the disposition of the auxiliary seat and platform, in their operative configurations, is such that use of the toilet by small children is facilitated, the platform acting as a step between the floor and the auxiliary seat and the aperture in the auxiliary seat being of a size to act as an effective ring seat for small children.

4. An accessory as claimed in claim 1, in which the support means comprises two support legs secured to the auxiliary seat and platform on opposite sides thereof.

5. An accessory as claimed in claim 4, in which the support legs extend beyond the platform to abut the floor in front of a toilet receptacle, in the operative configuration of the accessory, thereby enhancing the stability of the platform.

6. An accessory as claimed in claim 1, in which the auxiliary seat defines handle formations to permit the manipulation thereof.

7. An accessory as claimed in claim 1, in which the auxiliary seat is profiled to ensure proper seating thereon by small children.

8. An accessory as claimed in claim 1, in which the auxiliary seat, the platform and the support means are of a synthetic plastics material separately moulded and defining suitable formations for their assembly by clipping them together.

9. An accessory as claimed in claim 8, in which the auxiliary seat, platform and support means can releasably clip together to permit easy disassembly and assembly of the accessory.

* * * * *